United States Patent [19]

Began et al.

[11] Patent Number: 4,676,413
[45] Date of Patent: Jun. 30, 1987

[54] VEHICLE FRAME MOUNTED BICYCLE CARRIER

[75] Inventors: Dennis Began, Farmington Hills; Wayne L. Craig, Mt. Clemens, both of Mich.

[73] Assignee: Marco, Inc., Detroit, Mich.

[21] Appl. No.: 808,802

[22] Filed: Dec. 13, 1985

[51] Int. Cl.$^4$ ............................................. B60R 9/00
[52] U.S. Cl. ........................... 224/42.03 B; 224/42.07
[58] Field of Search ................. 224/42.03 B, 42.03 R, 224/42.03 A, 42.07

[56] References Cited

U.S. PATENT DOCUMENTS

| | | | |
|---|---|---|---|
| 2,529,686 | 11/1950 | Green | 224/42.03 R |
| 3,039,634 | 6/1962 | Hobson et al. | 224/42.03 R X |
| 3,794,227 | 2/1974 | Stearns | 224/42.03 B X |
| 3,876,123 | 4/1975 | Stuntz | 224/42.03 B |
| 3,917,138 | 11/1975 | Bergeron | 224/42.03 B |
| 3,923,220 | 12/1975 | Marcyan | 224/42.03 B |
| 4,318,501 | 3/1982 | Graber | 224/42.03 B X |
| 4,411,461 | 10/1983 | Rosenberg | 224/42.03 B X |

Primary Examiner—James E. Bryant, III
Assistant Examiner—Robert M. Petrik
Attorney, Agent, or Firm—Brooks & Kushman

[57] ABSTRACT

A bicycle carrier having a pair of frame mounting brackets secured to the frame of a vehicle at spaced locations which include tubular sleeves which extend from the rear of the vehicle toward the front of the vehicle. A rack assembly having a U-shaped support tube with an inverted U-shaped portion disposed substantially perpendicular to two ends extending from said portion toward the front of the vehicle. The ends are adapted to be received within the tubular sleeves of the mounting brackets. Bicycle hanger rods are secured to the top of the inverted U-shaped support tube and extend rearwardly therefrom. A locking hasp is provided to lock one or more bicycles onto the hanger rods. Two different embodiments of the frame mounting brackets are disclosed, one being a two-piece clamp for supporting the tube sleeve along its length, and the second, being a mounting plate having holes for bolting the bracket to corresponding holes formed in the frame of the vehicle and having a strut for supporting the tube sleeve along its length.

9 Claims, 7 Drawing Figures

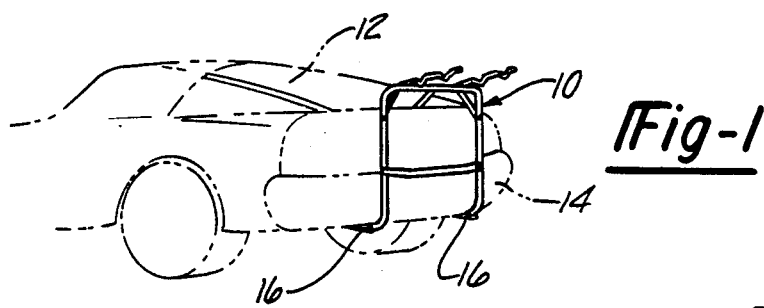
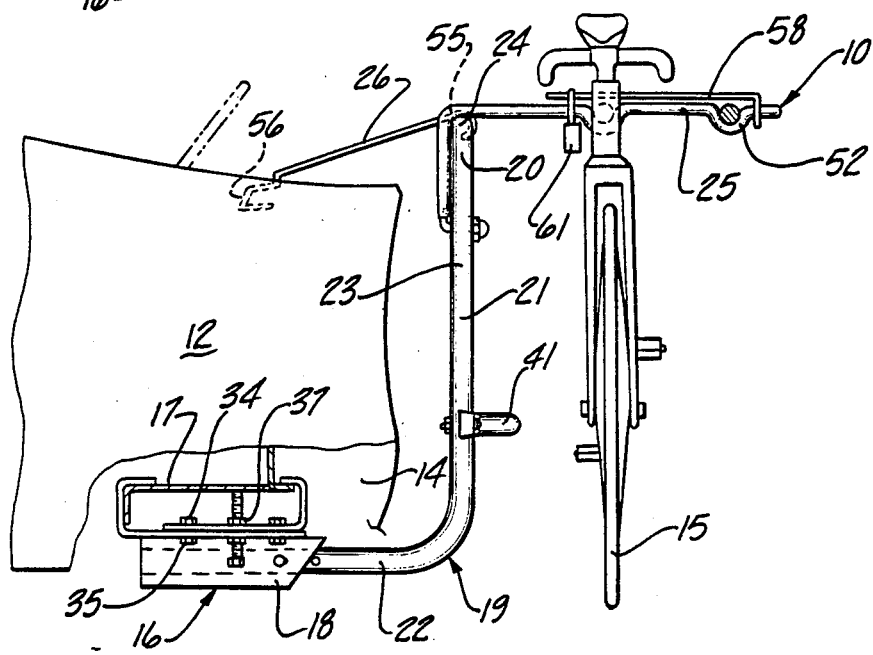
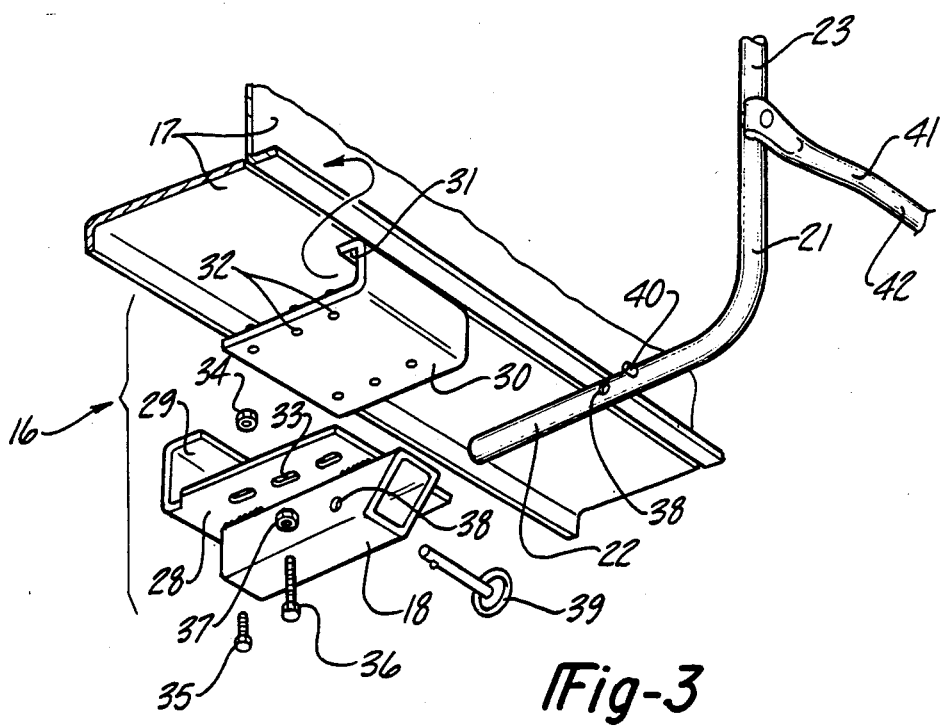

VEHICLE FRAME MOUNTED BICYCLE CARRIER

BACKGROUND OF THE INVENTION

I. Technical Field

The present invention relates to article carriers for vehicles and more specifically relates to bicycle carriers for vehicles having plastic sheathed bumpers.

II. Brief Description of the Background Art

Bicycle carriers for vehicles generally are one of three general types including bumper mounted carriers, trunk lid mounted carriers and roof mounted carriers.

Bumper mounted carriers heretofore have been the most common type of bicycle carriers. A bumper mounted carrier is one which clamps onto the bumper of a vehicle generally by engaging the top and bottom edges of the bumper. Bumper mounted carriers are simple and effective but rely upon the bumper being a rigid member capable of supporting the weight of the carrier and any bicycles attached to the carrier. Bumper mounted carriers, if not properly designed or installed, may scratch the chrome plated bumper surface which could lead to corrosion of the bumper surface. A primary drawback to the bumper mounted carrier is the trend in the design of automobiles away from rigid chrome plated bumpers and toward plastic sheathed bumpers. Bumper mounted bicycle carriers cannot be attached to a plastic sheathed bumper since they generally lack positively engageable top and bottom surfaces and are not sufficiently rigid to support the weight of the carrier and bicycles.

One type of bicycle carrier which does not rely upon the existence of a conventional rigid bumper is a trunk lid mounted carrier. Trunk lid carriers are generally provided with suction cups or rubber feet which rest upon the trunk lid and a rack which is strapped to the perimeter of the trunk lid. Bicycles are generally laid flat on the trunk lid carrier. Some of the disadvantages of the trunk lid carrier are that buckles and straps must be removed from bicycles or they may damage the finish of the trunk lid. Any mishandling of a bicycle while loading or unloading from the carrier may result in denting or scratching the trunk lid. The trunk lid mounted carriers also tend to interfere with trunk usage, especially if the bicycles are on the carrier when access to the trunk is desired.

Another type of bicycle carrier which does not rely upon the existence of a rigid bumper is the roof mounted carrier wherein bicycles are secured in an inverted position. However, with roof mounted carriers it is generally difficult to lift the bicycles onto and off of the carrier. Also, there is a significant danger of damaging the car roof if the bicycle is dropped as it is being placed onto or removed from the roof mounted carrier. Roof mounted carriers also suffer from the disadvantage of excessive height which prevents cars having bicycles on the carrier from using garages or parking structures and passing under low hanging tree limbs or other reduced clearance areas.

These and other problems, disadvantages and limitations are overcome by Applicant's invention as will be understood after studying the following specification in view of the attached drawings.

SUMMARY OF THE INVENTION

According to the present invention, a bicycle carrier adapted to be secured to the frame of a vehicle is provided in which first and second tube sleeves are secured to the underbody, or frame, of a vehicle to extend substantially parallel to the frame from the rear of the vehicle toward the front of the vehicle. A rack assembly is provided which includes a support tube having first and second ends extending toward the front of the vehicle. The first and second ends are spaced apart the same distance as the first and second tube sleeves and are adapted to be recevied within the tube sleeves. The support tube further includes an inverted U-shaped portion interconnecting the first and second ends and being disposed substantially perpendicularly to the ends. Means are provided for interlocking the first tube sleeve to the first end of the support tube and the second tube sleeve to the second end of the support tube. Two hanger rods are adapted to be secured to the top of and extend generally rearwardly from the U-shaped support tube. The hanger rods are disposed generally parallel to each other and spaced apart whereby at least one bicycle may be received and supported on the two hanger rods. At least one of said hanger rods includes a latch for detachably retaining the bicycle on the hanger rods.

According to another aspect of the present invention, the bicycle carrier includes unique adjustable mounting brackets each including interconnected J-shaped bracket parts which are slidable away from each other to pass around a frame member during installation and toward each other to lock onto the frame member. Each bracket includes a clamping member for positively locking the bracket to the frame member.

The alternative embodiment of the present invention includes frame mounting brackets each having a mounting plate adapted to mount flush to a transverse frame member which preferably includes mounting holes corresponding to mounting holes formed in the mounting plate. Each bracket also includes a strut secured to the mounting plate and the tube sleeve to provide support along the length of the tube sleeve.

According to another aspect of the present invention, a support strap is provided for connecting the top of the rack assembly to a lip of a body opening to further secure the rack to the vehicle. The support strap may be a rigid metal strap or strong flexible strap having a specially adapted body-engaging anchor.

A unique locking arrangement is provided wherein a L-shaped locking hasp may be fitted over the end of the hanger rods and anchored over one or more bicycles. The hasp is adapted to be locked in place by a standard padlock. Also, the bicycle carrier may be locked to the frame mounting bracket by locking at least one end of the support tube of the rack assembly to one of the bracket tube sleeves.

These and other advantages and objects of the invention will become apparent upon review of the following specification and the appended claims.

BRIEF DESCRIPTION OF THE DRAWINGS

FIG. 1 is a rear perspective view of the vehicle frame mounted bicycle carrier of the present invention attached to a vehicle having a plastic sheathed bumper.

FIG. 2 is a side elevation partially fragmentary cross-section view showing the interconnection of the frame mounting bracket to the frame of the vehicle.

FIG. 3 is an exploded perspective view of the frame mounting bracket, and frame and part of the rack assembly of the present invention.

DETAILED DESCRIPTION OF THE ILLUSTRATED EMBODIMENTS

Referring now to FIG. 1, a bicycle carrier 10 made in accordance with the present invention is shown secured to a vehicle 12 having a plastic sheathed rear bumper 14.

Figure 4:
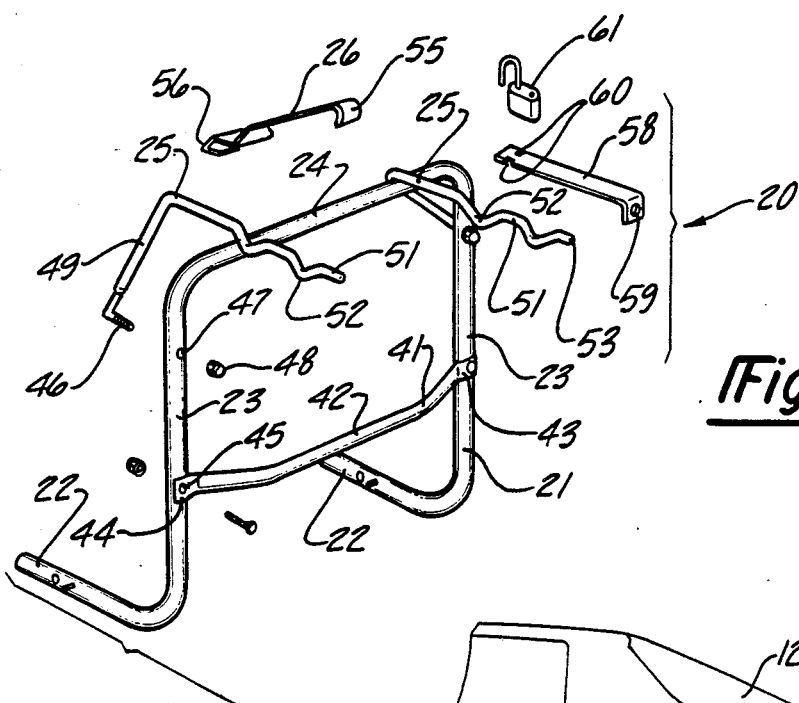
FIG. 4 is an exploded perspective view of the bicycle rack assembly of the present invention.

Referring now to FIGS. 2 through 4, a first illustrated embodiment of the invention will be explained in detail. In FIG. 2, bicycle 15 is shown attached to the bicycle carrier 10.

Two frame mounting brackets 16 are secured to the frame 17 at spaced locations preferably equidistant from the front to rear centerline of the vehicle. Each frame mounting bracket 16 includes a tube sleeve 18 which, in the illustrated embodiment, comprises a square tubular member that extends from the rear of the vehicle toward the front of the vehicle. The rear edge of each tube sleeve 18 is preferably cut on an angle to facilitate insertion of the rack assembly 19.

The term frame as used herein shall be construed to mean a portion of the automotive underbody construction located proximate the rear bumper and being sufficiently rigid to support the weight of the bicycle carrier 10 and any bicycles 15 secured thereto. It is understood that current automobile body design incorporates uni-body construction techniques wherein body panels include self-reinforcing elements and do not rely upon a frame as traditionally provided in automobiles. However, the present invention may be used with such uni-body constructed automobiles notwithstanding the lack of a frame per se.

The rack assembly is generally indicated by reference numeral 19 and includes a support tube 20 comprising a substantially inverted U-shaped tubular portion 20 and forwardly turned ends 22 disposed substantially perpendicularly to the spaced ends of the inverted U-shaped portion of the support tube 20. The forwardly turned ends 22 are disposed at the lower end of the vertical legs 23 which make up the two legs of the inverted U-shaped support tube 20. The vertical legs 23 are interconnected by a central span 24 corresponding to the central portion of the inverted U-shaped support tube 20. The forwardly turned ends 22 of the support tube 20 are adapted to be received within the two spaced tube sleeves 18 of the frame mounting brackets.

A key feature of the present invention is the provision of permanently mounted frame mounting brackets 16 having tube sleeves 18 which are adapted to receive in a supporting relationship the rack assembly 19. It will be readily appreciated tht the rack assembly 19 may be easily secured in the tube sleeves 18 and just as easily removed therefrom as a result of the telescopic relationship between the forwardly turned ends 22 and the tube sleeves 18. The tube sleeves 18 provide excellent support for the rack assembly 19 which is cantilevered from the tube sleeves 18 whereby forces exerted upon the rack assembly 19 are resisted by the tube sleeves 18.

Upward and downward bouncing of the rear end of the vehicle or side-to-side forces do not impair the secure mounting engagement of the forwardly turned ends 22 in the tube sleeves 18. It should be understood that the unique cantilevered and telescopic mounting arrangement may be achieved with any one of several frame mounting bracket arrangements.

As shown in FIGS. 2 and 4, hanger rods 25 comprising J-shaped members are secured over the central span 24 of the support tube 20. The hanger rods extend diagonally across the corner of the support tube 20 and are secured to the vertical legs 23 of the support tube 20. It should be noted that the base of each hanger rod 25 forms the hypotenuse of a right triangle defined by the vertical leg 23 and the central span 24 of the support tube 20, adding strength to the connection of the hanger rods 25 to the support tube 20.

In the preferred form of the present invention, although not essential to successful use of the invention, a support strap 26 is provided to restrain the support tube 20 on its upper end at the central span 24 by tying it back to a lip, or perimeter edge, of a body opening which is not considered a Class A surface. A Class A surface is a surface of an automobile which comprises the exterior skin of the automobile.

The frame mounting bracket 16, as shown in FIGS. 2 and 3, includes an outer bracket part 28 comprising a J-shaped part, preferably formed of sheet metal, having an upper flange 29 corresponding to the short leg of the J-shaped part. The frame mounting bracket 16 also includes an inner bracket 30 also comprising a J-shaped sheet metal part, preferably formed with an upper flange 31 corresponding to the short leg of the J-shaped part. The outer bracket 28 and inner bracket 30 are assembled together with the longer leg of the J-shaped parts overlapping one another. The inner bracket 30 includes a plurality of holes 32 and the outer bracket 28 includes a plurality of corresponding slots 33 through which nuts and bolts 34 and 35 are received to tie the inner and outer bracket parts together. When the inner and outer bracket parts are prepared for assembly to the frame 17, the nuts and bolts 34 and 35 loosely secure the inner bracket 30 and the outer bracket 28 together so tht they may slide relative to one another.

The sliding connection between the inner and outer bracket parts 28 and 30 is important to permit the upper flange 29 of the outer bracket 28 and the upper flange 31 of the inner bracket 30 to move away from each other as the mounting bracket 16 is moved over the frame 17 and then moved together after placement over the frame 17. The upper flanges 29 and 31 grip the upper surface of the frame 17 while the nuts and bolts 34 and 35 are fully tightened, locking the brackets 28 and 30 together. A clamping bolt 36 is provided to secure the mounting bracket 16 to the frame by applying a clamping force upon the opposite side of the frame 17 from the upper flanges 29 and 31. The clamping bolt 36 is preferably received within locking nuts 37 on opposite sides of the inner and outer bracket parts which provide a threaded receptacle for the clamping bolt 36 wherein the clamping bolt 36 may be biased against the bottom surface of the frame 17 and held in place by the locking nuts 37.

Corresponding interlocking holes 38 are provided in the forwardly turned ends 22 of the rack assembly 19 and in the tube sleeves 18. A detent ring pin 39 is received in the holes 38 to retain the forwardly turned ends of the rack assembly 19 in the tube sleeve 18. The detent ring pin 39 includes a ball detent on one end that prevents dislodging of the detent ring pin 39 from the holes 38. A positioning pin 40 extends from the side of the forwardly turned ends 22 of the rack assembly 19 to engage the rear edge of the tube sleeve 18 when the rack assembly 19 is fully inserted in the tube sleeve 18. The positioning pin 40 facilitates positioning the rack assembly 19 within the tube sleeve 18 and aligns of the holes 38 for reception of the detent ring pin 39. It should be noted that instead of the detent ring pin 39, a lock may be provided in one or both of the frame mounting brackets 16 that would prevent theft of the carrier and the bicycles together by someone who is familiar with the construction of the bicycle carrier of the present invention.

The rack assembly 19 preferably includes a spacer tube 41 which is connected to both of the vertical legs 23 of the support tube 20 preferably near the forwardly turned ends 22. The spacer tube 41 holds the legs of the inverted U-shaped support tube 20 at the proper spacing so that the forwardly turned ends 22 may be received within the tube sleeves 18. The spacer tube 41 also adds structural strength to the support tube 20. The spacer tube 41 may also be used to provide a lower support member for an elasticized cord if it desired to secure the lower portion of the bicycles to the lower portion of the rack assembly 20. The spacer tube 41 includes a central portion 42 which protrudes rearwardly slightly from the vertical legs 23 of the support tube 20 to provide clearance between the vehicle and the bicycles on the carrier. The spacer tube 41 includes first and second ends 43 and 44 which are arcuate in shape to accommodate the circular cross-section of the support tube 20. The support tube 20 and first and second ends 43 and 44 include corresponding holes 45 for receiving a fastener.

The hanger rods 25 are substantially J-shaped members with the short leg of the J-shaped member comprising a rearwardly extending threaded end 46 which is adapted to be received in holes 47 formed in each of the vertical legs 23. An acorn nut 48 is threaded onto the threaded end 46 to hold the hanger rods 25 securely on the support tube 20. A base leg 49 interconnects the rearwardly extending threaded end 47 to the bicycle receiving arms 51 forming a triangle with the corners of the support tube 20 as previously described.

The bicycle receiving arms 51 comprise the long leg of the hanger rods 25 and each include one or more cradle bends 52 spaced along their length between the base leg 49 and the terminal end 53 of the bicycle receiving arms 51. The cradle bends 52 are U-shaped depressions in the bicycle receiving arms which are adapted to receive the bicycle frame thereon.

Bicycles 15 are secured on the bicycle receiving arms 51 by means of a locking hasp 58 which comprises an L-shaped member having an opening 59 in the shorter leg of the L-shaped member through which the terminal end 53 of the bicycle receiving arms 51 is received. The locking hasp 58 includes notches 60 for receiving the U-shaped bolt of a pad or key lock 61 which also encircles the bicycle receiving arm 51 just in front of the cradle bend 52 closest to the vehicle 12. The locking hasp 58 prevents removal of the bicycles 15 while the lock 61 is affixed to the locking hasp 58 since the locking hasp 58 cannot slide over the terminal end 53 of the bicycle receiving arm 51 due to the location of the lock 61 and the notches 60 relative to the cradle bend 52.

In the embodiment shown in FIGS. 1 through 4, the support strap 26 comprises a metal strap having a hook 55 formed on one end to partially encircle the support tube 20 and having a specially configured clip 56 on the other end for engaging the gas tank fill door jamb or trunk lid opening perimeter on its other end. An alternative support strap 26 will be explained below.

Figure 5:
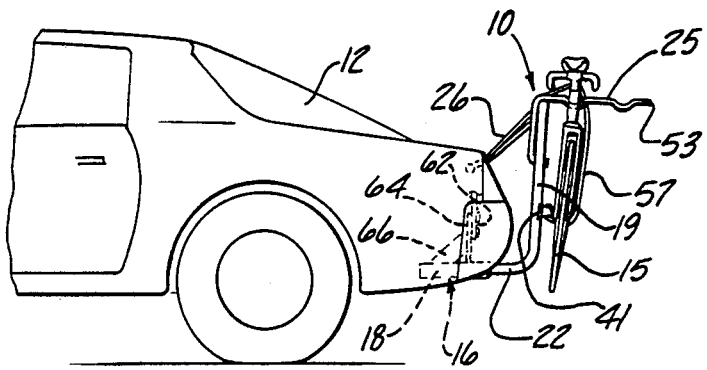
FIG. 5 is a partial side elevational view showing the bicycle carrier attached to a vehicle having a plastic sheathed bumper and showing two bicycles attached thereto and lashed in place.
Figure 6:
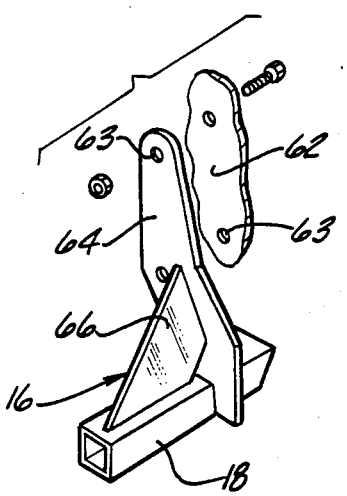
FIG. 6 is an exploded perspective view showing an alternative frame mounting bracket and a fragmentary section of a transverse frame member.
Figure 7:
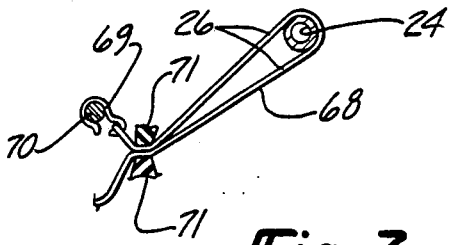
FIG. 7 is a cross-sectional view showing a flexible tie back and clip for attaching the upper portion of the support tube to an opening in a vehicle.

Referring now to FIGS. 5 through 7, an alternative embodiment of the present invention is shown which differs from the previously described embodiment in two important respects, the construction of the frame mounting bracket 16 and the type of support strap 26 used to tether the central span 24 of the support tube 20 to the upper portion of the car body.

The alternative embodiment of the bicycle carrier 10 is shown in FIG. 5 attached to a vehicle 12. Also shown in FIG. 5 are elasticized cords 57 secured around a bicycle 15 and extending from the central span 24 to the spacer tube 41.

The frame mounting bracket 16, as best shown in FIGS. 5 and 6, features the tube sleeve 18 which is identical in function to the tube sleeve 18 of the previously described embodiment. The mounting bracket 16 shown in FIGS. 5 and 6 is shown secured to a substantially transverse frame member 52 of the vehicle 12. Each frame mounting bracket 16 supports its associated tube sleeve 18 in the same orientation as the tube sleeves of the previously described embodiment. The frame mounting bracket 16 includes a mounting plate 64 which is preferably aligned in a plane relative to the tube sleeve 18 which is coplanar with the transverse frame member 62. The mounting plate 64 and transverse frame member 62 include corresponding mounting holes 63 which receive suitable fasteners. The tube sleeve 18 is further supported by a strut 66 which links the forward end of the tube sleeve 18 to the mounting plate 64 and holds it preferably at about a 90 degree angle to the mounting plate 64. The strut 66 is effective to brace the tube sleeve 18 and provide a cantilever support structure for the rack assembly 19 which is cantilevered and telescoped within the tube sleeve 18.

The details of the rack assembly 19 are essentially the same as in the previously described embodiment as are the elements which interconnect the forwardly turned ends 22 of the support tube 20 in the tube sleeves 18.

The support strap 26 used in the embodiment illustrated in FIGS. 5 through 7 is a fabric tie back 68 preferably formed of a nylon or other high strength flexible material. The tie back 68 preferably includes a clip 69 which is adapted to be secured to a bar 70 disposed in the trunk lid. The tie 68 extends from the clip 69 to and around the central span 24 of the support tube 20 and back into the trunk where it is held in place when the trunk is closed by the trunk lid seals 71.

The above detailed description of the two illustrated embodiments of the present invention is provided as a full and enabling description of two embodiments of the present invention. The above description is intended by way of example and not by way of limitation. It is understood that various modifications and changes may be made in the above disclosed embodiments without departing from the spirit and scope of the invention. The scope of the invention should therefore be determined by reference to the appended claims in view of the above specification.

We claim:

1. A bicycle carrier for a vehicle having a frame comprising:

first tube sleeve being a tubular member which extends substantially parallel to the frame from the rear of the vehicle toward the front of the vehicle;

second tube sleeve being a tubular member which extends substantially parallel to the frame from the rear of the vehicle toward the front of the vehicle and is disposed a spaced predetermined distance from said tubular member of said first tube sleeve;

first and second connecting means attached to said first and second tube sleeves respectively for connecting said tube sleeves to said frame;

a one-piece support tube formed by bending a single length of tubing to have first and second ends extending toward the front of the vehicle and being spaced apart the same distance as said first and second tube sleeves, first and second verticle legs extending upwardly and substantially perpendicularly to the first and second ends respectively from a bend in the support tube located between the first and second ends and the first and second vertical legs and having a central span extending between and perpendicular to said first and second vertical legs at the opposite ends of the vertical legs from the first and second ends;

first and second interlocking means adapted to engage said first and second tube sleeves and said first and second ends respectively for interlocking said first tube sleeve to said first end and said second tube sleeve to said second end;

first and second J-shaped hanger rods each having a long leg and a short leg interconnected by a base portion, said short legs being received in a hole formed in the vertical leg at a location spaced from the central span, said long legs extending over the central span and extending rearwardly therefrom generally parallel to each other, said long legs being adapted to receive at least one bicycle thereon, said base portion of the J-shaped hanger rods extending from the first and second vertical legs to the central span and substantially forming the hypotenuse of a right triangle which reinforces the support tube and securely anchors the hanger rods on the support tube; and means secured to at least one of said hanger rods for detachably retaining a bicycle on the hanger rods.

2. The bicycle carrier of claim 1 wherein said first and second connecting means each comprise a frame mounting bracket having oppositely oriented, interconnected J-shaped bracket parts each having a long and a short leg, said long legs being adjacent each other on a first side of the frame and said short legs being directed toward each other on a second side of said frame opposite the first side, and having a clamping member secured to at least one of said long legs, said clamping member having an end bearing upon said first side to clamp the frame mounting bracket on the frame.

3. The bicycle carrier of claim 2 wherein the short legs of said J-shaped bracket parts are selectively movable toward and away from each other whereby said short legs may be moved away from each other to clear the frame then move toward each other to close upon the frame.

4. The bicycle carrier of claim 1 wherein said first and second connecting means each comprise a mounting plate connected to one of the tube sleeves, said mounting plate being secured to the tube sleeve in a planar orientation coplanar with a portion of the vehicle frame;

a strut secured to the tube sleeve at a point forward of the mounting plate and to a portion of said mounting plate spaced from the tube sleeve.

5. The bicycle carrier of claim 1 wherein a support strap is attached to the central span of the support tube and to the vehicle at a point above said frame.

6. The bicycle carrier of claim 5 wherein said support strap is a rigid metal strap having a hook-shaped end on one end for receiving the central span and a clip on its opposite end for detachably engaging a perimeter edge of an opening in the vehicle.

7. The bicycle carrier of claim 5 wherein said support strap is a flexible tie back having a clip on one end for securing the tie back to the vehicle;

said strap being adapted to be passed around said central span and retained on its other end between seals having interference fit between a vehicle body opening and its associated cover.

8. The bicycle carrier of claim 1 wherein said means for detachably retaining the bicycle on the carrier is a L-shaped locking hasp having a short leg including an opening for receiving a terminal end of one of the hanger rods therein, said locking hasp including a pair of notches for receiving the U-shaped bolt of a lock which also encircles said hanger rod on the opposite side of a bend formed in the rod from said terminal end to preventing sliding movement of said locking hasp along said hanger rod toward said terminal end whereby bicycles retained by the carrier are locked in place by said locking hasp.

9. The bicycle carrier of claim 1 wherein at least one of said first and second interlocking means comprises a lock.

* * * * *